Dec. 17, 1940.                R. G. WALKER                2,225,140
              APPARATUS FOR COMPARING FLOOR MATERIALS
                          Filed May 29, 1939
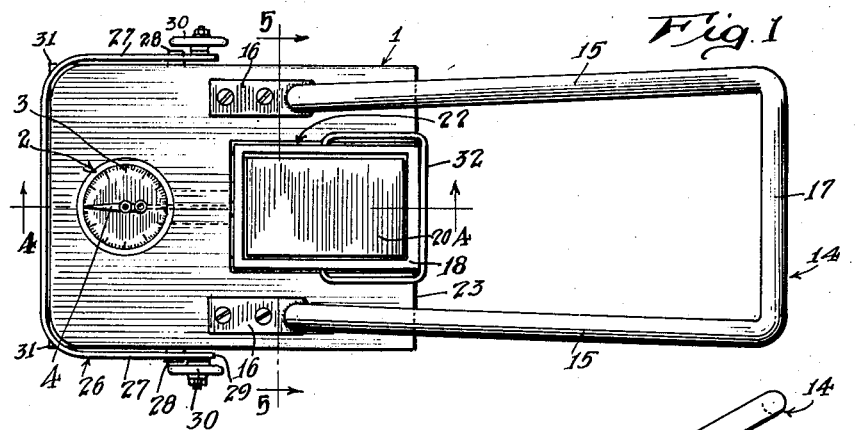
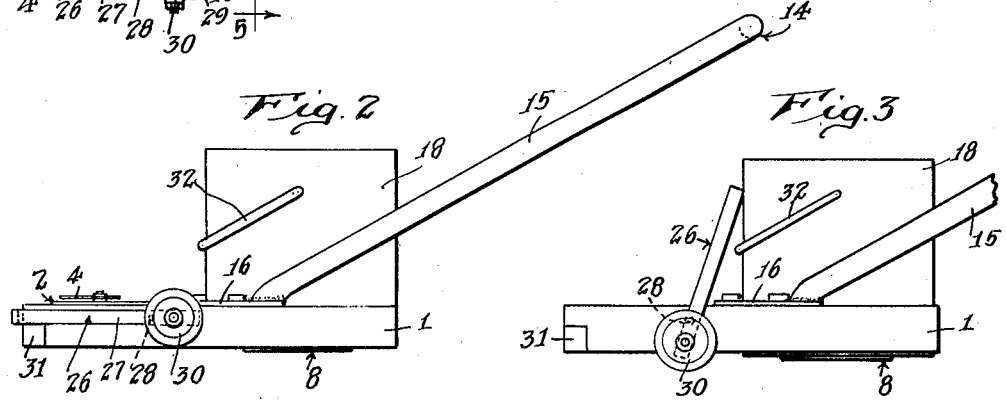
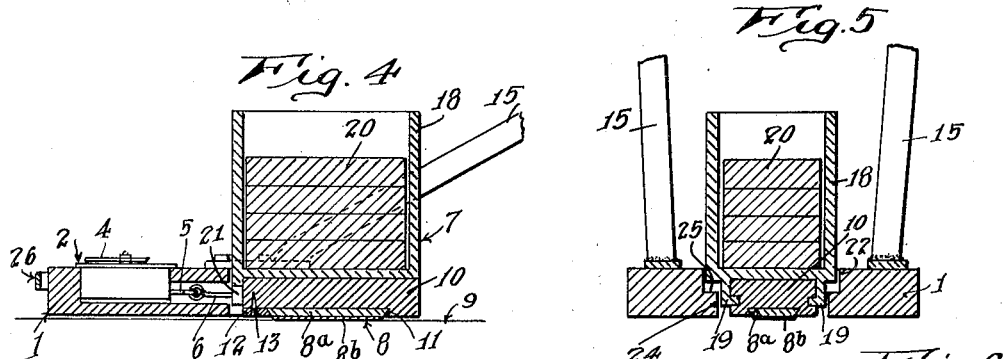
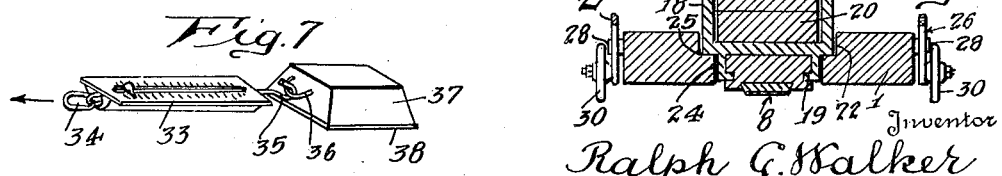
Inventor
Ralph G. Walker
By Lyon & Lyon
   Attorneys Patented Dec. 17, 1940

2,225,140

UNITED STATES PATENT OFFICE 2,225,140

APPARATUS FOR COMPARING FLOOR MATERIALS

Ralph G. Walker, Los Angeles, Calif., assignor to Kelite Products, Inc., a corporation of California Application May 29, 1939, Serial No. 276,347

3 Claims. (Cl. 265—10)

This invention relates to a simple machine for testing the condition of a surface such as the surface of a floor.

Many accidents occur from persons slipping on waxed or polished floors.

One of the objects of this invention is to provide a simple device or machine for enabling the condition of a floor surface to be tested in such a way as to indicate the relative degree of safety that such floor surfaces have in walking upon the same. Though the device may be used for testing the surface of waxed floors, it is also applicable for comparing the surfaces of linoleum or other floor materials.

A further object of the invention is to provide a device of this kind, of simple construction, which can readily be applied to a floor surface for testing the same, and so constructed that it can be readily trundled over the floor when moving it to or from the point where the test is to be made.

In practicing the invention, a piece of any desired material having a contact area on its under side is carried on the machine, and moved along in contact with the surface to be tested. This contact piece may be formed of leather such as used in forming shoe soles, or may be formed of rubber such as used in the heels of shoes. One of the objects of the invention is to construct the device so that the piece of testing material can be readily removed and replaced by a different material; also to provide means for varying the force with which the contact piece is pressed down upon the floor.

Further objects of the invention will appear hereinafter.

The invention consists in the novel parts and combination of parts to be described hereinafter, all of which contribute to produce an efficient apparatus for comparing floor materials.

A preferred embodiment of the invention is described in the following specification, while the broad scope of the invention is pointed out in the appended claims.

In the drawing:

Fig. 1 is a plan of a testing machine embodying my invention.

Fig. 2 is a side elevation of the machine or device shown in Fig. 1, illustrating the device with the parts in the relation which they have when the machine is in operation on the floor.

Fig. 3 illustrates the device raised on wheels that hold the device in an elevated position to enable it to be trundled about or wheeled to the place where it is to be used.

Fig. 4 is a vertical section taken about on the line 4—4 of Fig. 1, and further illustrating details of the device. This view particularly illustrates the means for supporting the contact piece in position, and also illustrates means for enabling the weight borne by the contact piece to be regulated as may be desired in conducting the test.

Fig. 5 is a cross-section taken about on the line 5—5 of Fig. 1, and further illustrating the details of the construction.

Fig. 6 is a section taken at about the same point as the section line 5—5, but illustrating the parts in the relation indicated in Fig. 3; that is to say, with the body of the device supported on the wheels to enable it to be moved freely about.

Fig. 7 is a perspective illustrating another very simple embodiment of the invention.

Before proceeding to a more detailed description of the invention, it should be stated that in practicing the invention I provide a part that I call a drag, because this is the part that I dragged, pulled or pushed across the floor, and which carries on its under side a contact area to engage the surface of the floor. This drag is connected with a spring scale of any suitable construction, and the arrangement of the parts is such that when the drag is forced across the floor, its resistance to movement will be indicated on the scale. In this way by using the same contact element on different floor surfaces, the relative slipperiness of the different surfaces can be compared and, of course, the floor surface that has the highest index or indicated force on the scale, will be the surface that is less slippery and dangerous than any others tested that have a lower index. The device is so constructed, that when it is not being pushed across the floor in a test, the body of the device can be held in an elevated position to maintain the contact element out of engagement with the floor, and this means preferably includes small wheels or rollers which enable the device to be readily moved from place to place when not being used for testing purposes.

In order to enable different contact materials to be used in testing floor surfaces, the contact material is preferably mounted on a removable slab or block that can be readily put into place in a machine, and the machine is preferably constructed with means for regulating the amount of weight supported by this block to adapt the resistance to movement of the drag, to the range of indications on the spring scale.

In Figs. 1 to 6 I illustrate a simple embodiment of the device in which the body 1 of the device is of substantially rectangular form, and constructed so that it can carry a spring scale 2. In the present instance this spring scale is of circular form, presenting circumferentially disposed numbered graduations 3 cooperating with a pointer 4 rotatably supported at the center of the dial. The scale 2 includes a spring of any suitable kind (not illustrated). The pointer 4 of the scale is actuated through the medium of an operating shank 5 attached to a draw-bar 6, and this draw-bar is connected with a part that I call a drag 7. This drag is associated with the body 1 in such a way that it and the body are capable of relative movement in a horizontal direction; that is to say, in the direction in which the pull or draft occurs in the draw-bar 6. In practice, for this purpose I prefer to guide the drag 7 on or in the body 1 along a line connecting the drag with the center of the scale, and this line, of course, coincides with the line of draft along which the shank 5 and draw-bar 6 extend.

Any suitable means is provided for advancing the body 1 across the floor while the contact element 8 on the under side of the drag is in contact with the upper surface 9 of the floor. If the machine is to be used for testing the relative slipperiness of floor surfaces as regards the sole of a leather shoe, then this contact element 8 should consist of material cut from the sole of a shoe, or at least a very similar piece of leather. The contact element preferably includes a small slab 8a of wood or similar material, and the contact material proper, 8b, is glued or otherwise secured to the under face of the small slab 8a. The contact element is preferably removably secured on the under side of a block 10 that constitutes the body of the drag 7. This block 10 is preferably formed with a dove-tailed groove 11 extending into the same from its front end. This enables the contact element 8 to be slid into position from the front. After sliding it into place, it may be secured there by means of a keeper 12 in the form of a small plate secured in position by means of a small screw 13, or other fastening means.

In order to enable the machine to be pushed across the floor surface that is to be tested, I prefer to provide it with an upwardly inclined handle 14 including two converging forks 15, the forward ends of which are provided with feet 16 attached to the upper face of the body 1, and the rear ends of these forks 15 are connected by a horizontal cross-head or cross-bar 17 which operates as a hand-hold to be grasped by the operator of the machine.

Of course, the pull of the drag on the scale will depend largely upon the force with which the contact element is pressed down upon the floor surface 9. In order to enable this force to be regulated to bring the force within the range of the scale 2, I prefer to provide a box 18 that rides on the upper side of the block 10, and if desired, this box 18 may be formed on its under side with downwardly and inwardly projecting flanges 19 (see Fig. 5) that operate as tongues to be received in corresponding grooves formed on the sides of the block 10. This enables the block to be slid into place from the rear. The box 18 provides a chamber on its interior for receiving any desired number of weights 20 which are preferably of rectangular form to fit the horizontal cross-section of the box.

The bottom of the box 18 is provided at its forward end with a downwardly projecting transverse flange 21 (see Fig. 4) that extends downwardly against the forward vertical face of the block 10. In order to receive and guide the block 10 in the body 1, the said body is provided with a wide slot 22 that extends into the body from its rear edge 23. The side faces 24 of this slot 22 are rabbeted so as to form substantially horizontal shoulders 25. When the machine is in operation testing a floor surface, this shoulder 25 lies depressed, with the body 1 of which it forms a part, (see Fig. 5). This permits the full weight of the drag to be applied to the floor surface through the contact element 8. When the test is over, the body 1 can be moved to a raised position so as to raise the shoulders 25 and lift the drag off of the floor. Any suitable means may be provided for this purpose. In the present instance, I have illustrated a device for this purpose in the form of a bail 26 having two side arms 27 that are pivotally mounted on pins 28 projecting outwardly from the sides of the body 1. These arms 27 have projecting ends 29 that extend beyond these pivots and carry rollers or small wheels 30 respectively. When the bail 26 is folded down so as to rest upon the upper faces of two side blocks 31 on the body 1, the wheels 30 will be held above the lower face of the body and out of contact with the floor. However, if the bail is pulled up to a position such as that indicated in Fig. 3, the rollers 30 will be moved down to a depressed position with respect to the body, thereby elevating the body and causing the shoulders 25 to lift the box 18 and the contact element 8 off of the floor. In this position of the bail illustrated in Fig. 3, the vertical thrust of the floor against the under sides of the rollers, is disposed to the left of the pivot 28 so that the bail will maintain itself in this position with the upper portion of the bail maintaining itself against the forward face of the box 18.

If desired, the box 18 may be provided with a bail 32 for facilitating handling the same.

In Fig. 7 I illustrate a very simple embodiment of the invention in which, instead of employing a round spring scale 2, I employ a common type of straight weighing scale 33, the forward end of which is provided with a ring 34 to which a drag force may be applied. The rear end of the scale 33 is provided with the usual hook 35 which is engaged in a staple or eye 36 projecting forwardly from the forward face of a drag 37 in the form of a block, the under face of which carries the contact material 38.

Many other embodiments of this invention may be resorted to without departing from the spirit of the invention.

What I claim is:

1. In a floor surface testing machine, the combination of a body to be moved across the floor, a drag having a flat bottom surface to engage the floor, means for guiding the drag on the body to permit relative movement between the same in a horizontal direction, a handle for applying force to the said body in a direction to move the drag across the floor, and a spring scale between the body and the drag for indicating the force necessary to move the drag across the floor.

2. In a floor surface testing machine, the combination of a body to be moved across the floor, a spring scale carried by the body, a drag having a flat contact surface to engage the floor, said body having means for guiding the drag along a line connecting the drag with the scale, a handle connected with said body for pushing the same in the direction that said line extends so that the force developed in advancing the drag across the floor is indicated by the said scale.

3. In a floor surface testing machine, the combination of a body to be moved across the floor, a spring scale carried by the body, a drag having a contact surface to engage the floor, said body having means for guiding the drag along a line connecting the drag with the scale, a handle connected with said body for pushing the same in the direction that said line extends so that the force developed in advancing the drag across the floor is indicated by the said scale, and a pair of wheels with movable means for mounting the same on the body, operating to enable the body to be supported on the wheels at will, to move the same about.

RALPH G. WALKER.